No. 784,883. PATENTED MAR. 14, 1905.
J. PIRIE.
APPARATUS FOR HEATING TOOLS.
APPLICATION FILED SEPT. 2, 1903.
2 SHEETS—SHEET 1.
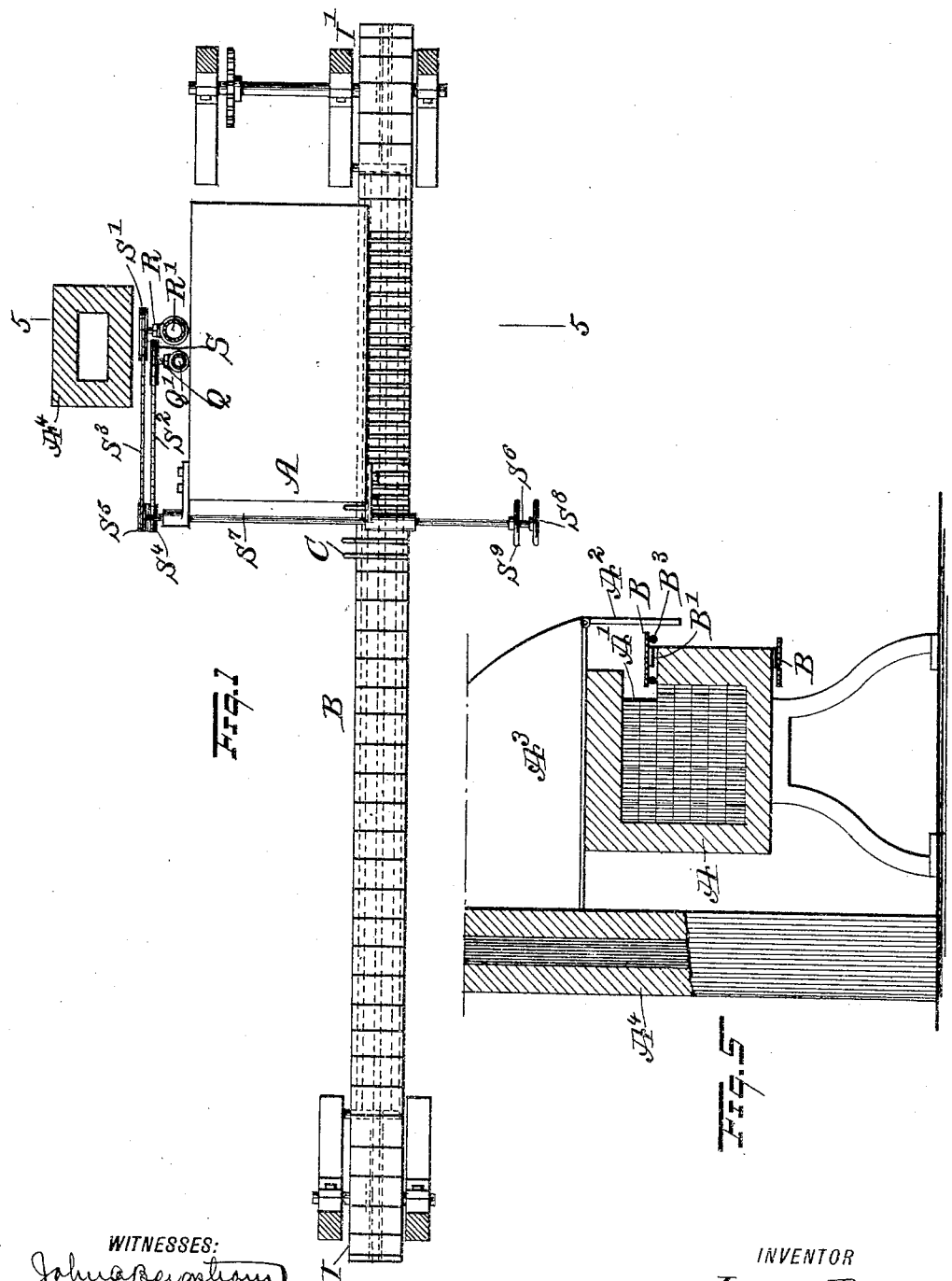
WITNESSES:
INVENTOR
James Pirie
BY
ATTORNEYS

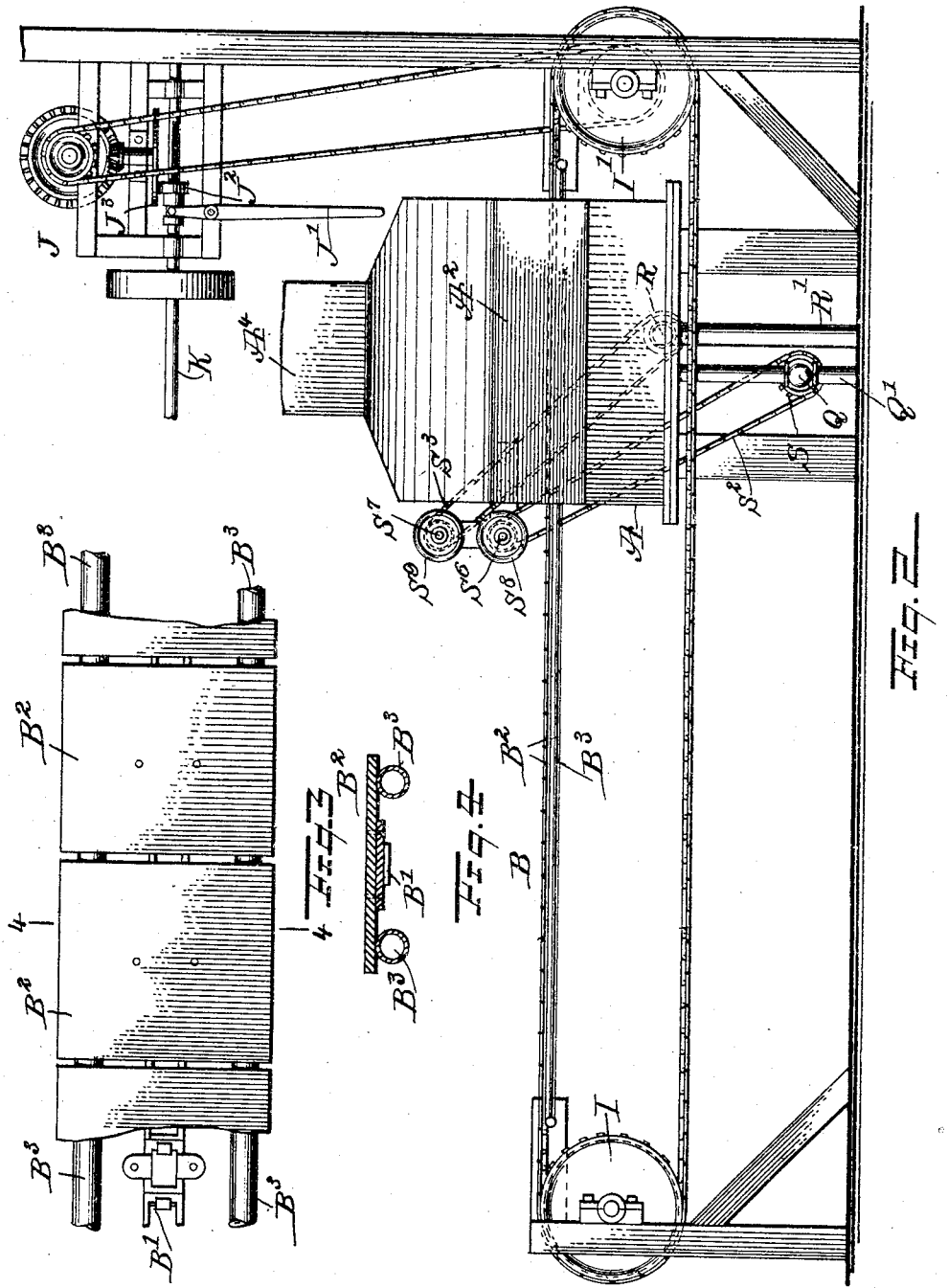

No. 784,883.

Patented March 14, 1905.

UNITED STATES PATENT OFFICE.

JAMES PIRIE, OF MONTPELIER, VERMONT, ASSIGNOR TO PIRIE TOOL SHARPENING MACHINE COMPANY, OF MONTPELIER, VERMONT.

APPARATUS FOR HEATING TOOLS.

SPECIFICATION forming part of Letters Patent No. 784,883, dated March 14, 1905.

Application filed September 2, 1903. Serial No. 171,644.

*To all whom it may concern:*

Be it known that I, JAMES PIRIE, a citizen of the United States, and a resident of Montpelier, in the county of Washington and State of Vermont, have invented a new and Improved Apparatus for Heating Tools, of which the following is a full, clear, and exact description.

The invention relates to apparatus for heating stone-cutters' tools—such as points, chisels, hammers, drills, and the like—prior to sharpening the same; and the object of the invention is to provide a new and improved tool-heating apparatus which is simple and durable in construction and arranged to enable a single operator to heat a large number of tools in a comparatively short time.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement, parts being in section. Fig. 2 is a side elevation of the improvement. Fig. 3 is an enlarged plan view of part of the tool-carrier for carrying the tools to the forge. Fig. 4 is a cross-section of the same. Fig. 5 is a cross-section of the improvement on the line 5 5 of Fig. 1.

The forge A, preferably of the oil-burner type, is provided in its front upper portion with a longitudinal opening A' for the passage of the upper run of an endless carrier B, employed for carrying the tool C to be heated in such a manner that the cutting end of the tool passes through the forge A for the latter to heat the said cutting edge, it being understood that the speed of the carrier B and the temperature in the forge A are so regulated as to enable the operator to readily perform the work described and to enable the operator to handle a very large number of tools in a comparatively short time.

The carrier B consists, preferably, of an endless link chain B', on which are riveted or otherwise secured platforms $B^2$ for supporting the tools C, and the said link chain B' passes over sprocket-wheels I and I', journaled in suitable bearings, and of which the sprocket-wheel I' is driven by an overhead driving-gear J, driven from the main shaft K by suitable devices under the control of the operator to permit of increasing or decreasing the speed of the endless carrier B, according to circumstances.

For the purpose mentioned a lever J' is arranged connected with a speed-changing device, such as a friction-wheel $J^2$, mounted to turn with and to slide on the shaft K and in engagement with a friction-wheel $J^3$, forming part of the driving-gear J. The platforms $B^2$ between the wheels I and I' ride on suitable supporting-bars $B^3$, as plainly illustrated in Figs. 3 and 4. The tools C are placed on the platforms $B^2$ at or near the sprocket-wheel I, and the heated tools are removed from the said platforms between the exit end of the forge and the sprocket-wheel I'.

The operator is protected from the heat of the forge by suitable aprons $A^2$, hung on the forge-hood $A^3$, connected with the chimney $A^4$ for carrying off the heat and gases. (See Fig. 5.) The heat in the forge is regulated by means under the control of the operator, and for this purpose suitable connections are made with the valve Q of the oil or gas supply pipe Q' and with the valve R of the air-supply pipe R' of the forge, so that the operator by manipulating the said connections can increase or decrease the fuel-supply for the forge, and thereby regulate the heat therein to insure proper heating of the tools C.

The connections mentioned may be such as shown in Figs. 1 and 2—that is, on the valve-stems of the valves Q and R are secured sprocket-wheels S S', connected by sprocket-chains $S^2$ $S^3$ with sprocket-wheels $S^4$ $S^5$ on transverse shafts $S^6$ $S^7$, journaled in suitable bearings attached to the forge A, and on the said shafts are hand-wheels $S^8$ $S^9$ within convenient reach of the operator to enable the operator to turn the hand-wheels to open and close the valves Q and R more or less to regulate the supply of the fuel to the forge, and thereby control the heat in the forge.

Having thus described my invention, I claim as new and desire to secure by Letters Patent—

1. An apparatus for heating tools, comprising a forge having a longitudinal opening in its front portion at the top thereof, an endless carrier for the tools having its upper run passing through the said opening, the carrier being arranged to carry the points of the tools through the forge with the shanks in the open air, means for supplying fuel to the forge to cause the heat to rush up at the inner face of the front wall and come in contact with the points of the tools to heat the points only, and an apron or shield suspended from the forge-hood and extending in front of said opening, and the upper run of said carrier.

2. An apparatus for heating tools comprising a forge having a longitudinal opening in its front portion at the top thereof, means for supplying fuel to said forge, the said opening at the top causing the heat to rush upward at the inner face of the front wall to said opening, an endless carrier having its upper run passing horizontally through said opening above the upper face of the front wall and arranged to carry tools with their cutting edges extending into the forge to be met by the upwardly-rushing heat from the forge, the top wall of the forge forming the top of said opening and projecting but a short distance beyond the inner face of the front wall to permit the heat to pass upward over the inner edge of the carrier without coming in contact with the shanks of the tools, as set forth.

3. In an apparatus for heating tools, a forge having a longitudinal opening in its front portion at the top thereof, means for supplying fuel to said forge, the said opening at the top causing the heat to rush upward at the inner face of the front wall to said opening, an endless carrier for the tools having its upper run passing horizontally through the said opening above the upper face of the front wall of the forge and arranged to carry tools with their cutting edges extending into the forge to be met by the upwardly-rushing heat from the forge, the top wall of the forge forming the top of said opening and projecting but a short distance beyond the inner face of the front wall to permit the heat to pass upward over the inner edge of the carrier, and means for regulating the speed of the said carrier, as set forth.

4. An apparatus for heating tools, comprising a forge having a longitudinal opening in its front portion at the top thereof, an endless carrier for the tools having a portion of its upper run passing horizontally through the said opening in the forge to carry the tools through the forge to heat their cutting edges, the said carrier comprising an endless link chain, platforms secured on the chain for supporting the tools, sprocket-wheels around which the chain passes and parallel supporting-bars extending horizontally between the sprocket-wheels and on which the platforms ride, means for supplying fuel and air to the lower part of the forge, means under the control of the operator for regulating the fuel-supply, and means for regulating the speed of the carrier, as set forth.

5. An apparatus for heating tools prior to sharpening the same and comprising a forge having a longitudinal opening in its front portion at the top thereof, an endless carrier for the tools having its upper run passing horizontally through the said opening in the forge to carry the tools through the upper part of the forge to heat the cutting edges of the same, the said carrier comprising an endless link chain, platforms secured on the chain for supporting the tools, sprocket-wheels around which the chain passes, parallel supporting-bars extending horizontally between the sprocket-wheels and on which the platforms ride, means for driving one of said sprocket-wheels, and a shield suspended in front of the opening in the forge, as set forth.

6. An apparatus for heating tools comprising a forge having a longitudinal opening in its front portion at the top thereof, the opening at the top causing the heat from the fuel in the forge to rush upward at the inner face of the front wall to said opening, an endless carrier having its upper run passing horizontally through said opening above the upper face of the front wall and arranged to carry tools with their cutting edges extending into the forge to be met by the upwardly-rushing heat from the fuel, the forge-wall at the top of said opening projecting over the inner edge only of the carrier to permit the heat to pass upward over the said inner edge of the carrier without coming in contact with the shanks of the tools, and a shield arranged in front of the said opening and extending below the upper run of the carrier at the outer side thereof, as set forth.

In testimony whereof I have signed my name to this specification in the presence of two subscribing witnesses.

JAMES PIRIE.

Witnesses:
CLYDE D. TEMPLETON,
TIMOTHY R. MERRILL.